Inventor
George Daniel Goss

UNITED STATES PATENT OFFICE.

GEORGE DANIEL GOSS, OF ARMOUR, SOUTH DAKOTA.

UPSETTING-PREVENTING AND HITCHING ATTACHMENT FOR TRACTORS.

1,356,139.     Specification of Letters Patent.     Patented Oct. 19, 1920.

Application filed July 15, 1919. Serial No. 310,916.

*To all whom it may concern:*

Be it known that I, GEORGE DANIEL GOSS, a citizen of the United States, residing at Armour, in the county of Douglas, State of South Dakota, have invented certain new and useful Improvements in Upsetting-Preventing and Hitching Attachments for Tractors; and I do hereby declare the following to be a full, clear, and exact description of the invention, such as will enable others skilled in the art to which it appertains to make and use the same.

This invention relates to new and useful improvements in attachments for tractors, and particularly to attachments for Fordson tractors.

One object of the present invention is to provide a novel and improved device which is attached to the rear of the tractor and by means of which other machines which are to be pulled by the tractor can be easily and quickly hitched to the tractor.

Another object is to provide a novel and improved device of this character which serves to prevent the backward tilting or upsetting of the tractor when an excessive load is placed thereon.

Other objects and advantages will be apparent from the following description when taken in connection with the accompanying drawing.

Figure 1:
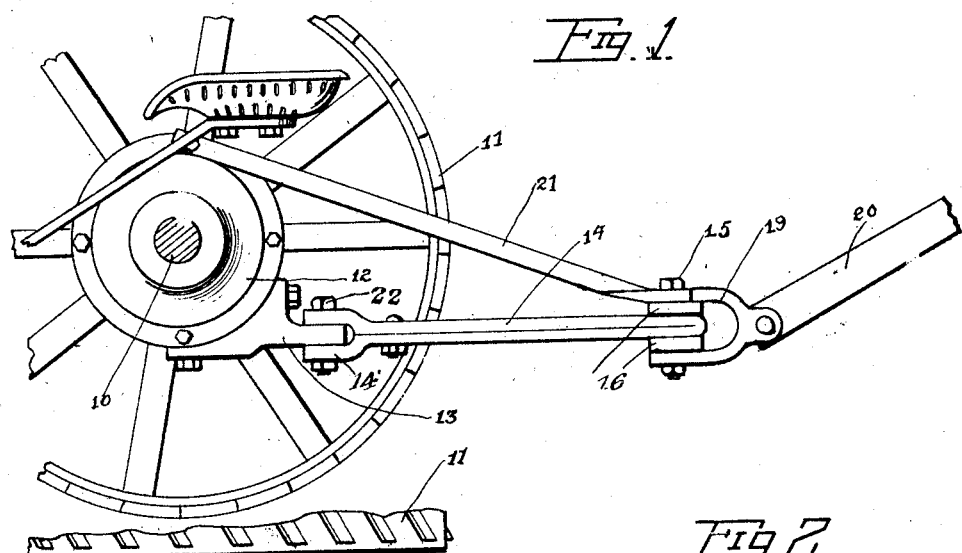
Figure 1 is a side elevation of a portion of a tractor and an agricultural machine hitched thereto, showing the position of the attachment.
Figure 2:
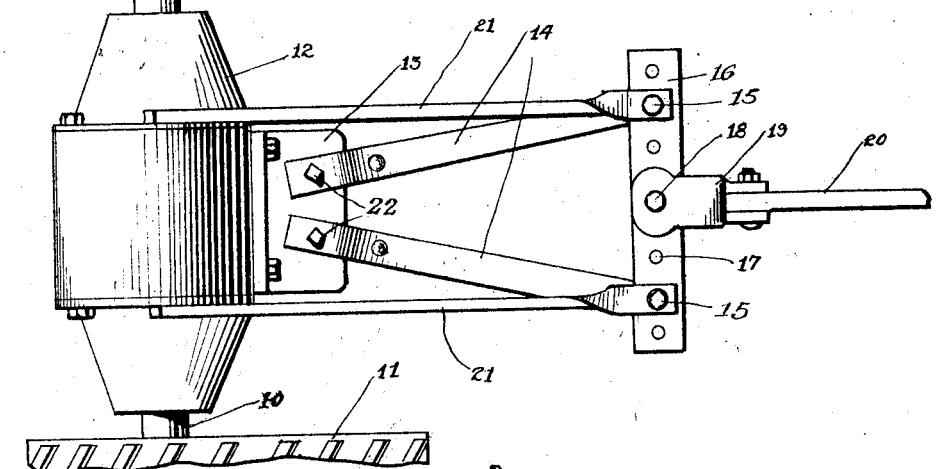
Fig. 2 is a top plan view of the parts shown in Fig. 1, showing the relative location of the different parts.
Figure 3:
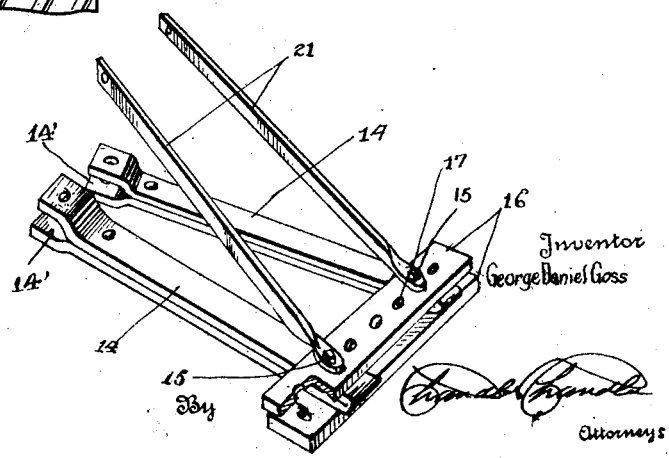
Fig. 3 is a perspective view of the attachment removed from the tractor and agricultural machine.

Referring particularly to the accompanying drawing, 10 represents the axle of a tractor, and 11 the ground engaging wheels thereof. The gear case 12 has a rearwardly extending apertured lug 13 secured to the lower rear portion thereof, and with which is ordinarily and directly connected the clevis of the farm implement or other load with which the tractor is connected.

The present attachment comprises a pair of arms 14, each of which consists of a flat metal bar that is bent upon itself so that the resultant parallel parts are in mutual contact throughout their lengths, excepting at their ends, where they are spaced apart to form the fork 14'. At the opposite ends of the arms 14 from the forks 14', are disposed the transverse plate 16, between which the arms 14 are disposed so that one of these plates lies upon the arms and the other against the under faces of the arms, in which positions they are held by the bolts 15 that are engaged through the plates and the arms.

Braces 21 are each disposed at one end upon the upper plate 16 and are held in position by the said bolts 15 that are passed downwardly through them.

The attachment is secured in place by disposing the arms 14 to receive the draft lug 13 of the tractor within their forks 14' and are held in such positions by the bolts 22. The braces 21 are continued from the upper plate 16, upwardly and forwardly, where they are bolted to corresponding parts of the tractor casing 12. It will be noted that while the braces 21 are substantially parallel, the arms 14 diverge rearwardly and that the connection of the arms and braces with the plates 16, are short of the ends of the latter.

Through the plates 16 are formed vertically registering perforations 17, the endmost perforations being beyond the arms 14. Two of the perforations are utilized to receive the bolts 15, while the remaining perforations are designed to interchangeably receive the clevis bolt 18 of the clevis 19 carried by the draft bar 20 of the implement or other load in connection with which the tractor is to be used.

It will be noted that the distance from the plates 16 to the rear of the draft lug 13 is considerably greater than the distance between the draft lug and the lowermost points of the tractor wheels, so that should the lug 13 swing downwardly as happens when the tractor has an excessive load, such movement will be arrested by contact of the lower plate 16 with the surface of the ground, before there will have been sufficient movement to cause the tractor to tilt over in the manner well known to those having to do with the subject.

It is found in practice that this attachment is entirely effective for the purposes mentioned, while its simplicity and consequent economy of manufacture together with its durability, are apparent.

What is claimed is:

The combination with a tractor having a casing and a draft lug projecting rearwardly from the lower portion thereof, of a combined draft attachment and upsetting preventing frame structure removably connected therewith and extending rearwardly from the tractor in position to engage the ground and support the tractor against rearward upsetting when the tractor begins to tilt, said frame structure comprising a pair of rearwardly extending horizontal arms having forked forward ends within which the draft lug is bolted, a pair of plates disposed respectively against the upper and lower faces of the rear end portions of the arms and having each a longitudinal series of perforations, the perforations of one series registering with those of the other in pairs to receive in the pairs of perforations interchangeably a clevis bolt, and braces extending from the upper plate above the rear ends of arms respectively upwardly and forwardly to the tractor case, and to which latter they are bolted.

In testimony whereof I affix my signature in the presence of two witnesses.

GEORGE DANIEL GOSS.

Witnesses:
R. C. SPAULDING,
OLIVE DURFEY.